United States Patent
Yoshida

(10) Patent No.: US 7,284,164 B2
(45) Date of Patent: Oct. 16, 2007

(54) METHOD AND APPARATUS FOR ERROR CORRECTION OF READ DATA IN A DISK DRIVE

(75) Inventor: Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 547 days.

(21) Appl. No.: 10/448,329

(22) Filed: May 30, 2003

(65) Prior Publication Data
US 2004/0153729 A1    Aug. 5, 2004

(30) Foreign Application Priority Data
May 31, 2002    (JP)    ............... 2002-160689

(51) Int. Cl.
*G06F 11/00*    (2006.01)
(52) U.S. Cl. .................. 714/54; 714/765; 714/763
(58) Field of Classification Search ............. 714/5, 714/8, 763, 765
See application file for complete search history.

(56) References Cited

U.S. PATENT DOCUMENTS

| 5,546,556 | A |   | 8/1996 | Matsushita |
| 6,043,946 | A | * | 3/2000 | Genheimer et al. ........... 360/53 |
| 6,088,825 | A |   | 7/2000 | Ikushima et al. |
| 7,171,607 | B2 | * | 1/2007 | Tsunoda ...................... 714/765 |
| 2003/0066017 | A1 | * | 4/2003 | Kuwamura .................. 714/785 |

FOREIGN PATENT DOCUMENTS

| EP | 0782138 A2 | 7/1997 |
| JP | 62-236185 A | 10/1987 |
| JP | 11-163739 | 6/1999 |
| JP | 2001-67783 A | 3/2001 |

OTHER PUBLICATIONS

Austrian Search Report dated Nov. 30, 2004 for Appln. No. 200303246-3.

* cited by examiner

*Primary Examiner*—Robert Beausoliel
*Assistant Examiner*—Philip Guyton
(74) *Attorney, Agent, or Firm*—Pillsbury Winthrop Shaw Pittman, LLP

(57) ABSTRACT

A disk drive comprising a read channel including a decoder and an EP unit, and a disk controller including an error correction unit is disclosed. The EP unit generates error positional information showing an error position among data output from the decoder. The disk controller has an EP buffer memory accumulating the error positional information. The error correction unit executes error correction by using highly accurate error positional information from the EP buffer memory.

16 Claims, 3 Drawing Sheets

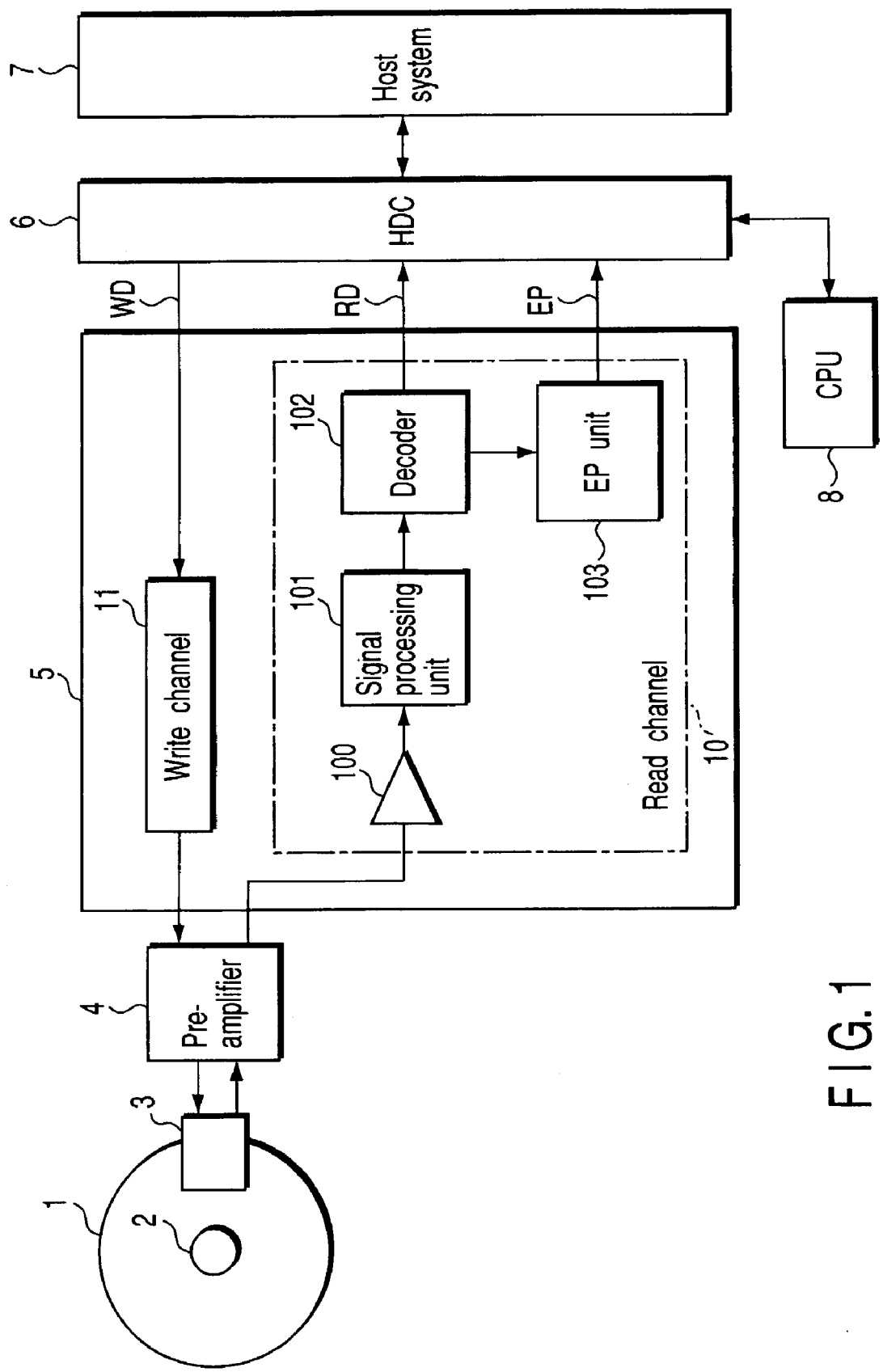
F I G. 1

METHOD AND APPARATUS FOR ERROR CORRECTION OF READ DATA IN A DISK DRIVE

CROSS-REFERENCE TO RELATED APPLICATIONS

This application is based upon and claims the benefit of priority from the prior Japanese Patent Application No. 2002-160689, filed May 31, 2002, the entire contents of which are incorporated herein by reference.

BACKGROUND OF THE INVENTION

1. Field of the Invention

The present invention generally relates to the field of disk drives, and in particular, to an error correction technique at the time of a read operation.

2. Description of the Related Art

Generally, disk drives, a typical example of which is a hard disk drive, record data on a disk medium and read data from the disk medium by means of a head. In this read operation for reading data, the data is reproduced (decoded) by a read channel from a data signal output from the head into user data which is the original recorded data.

In the read operation, there are cases in which an error arises in a data bit row included in the data signal due to effects such as noise. In a normal disk drive, ECC data which is necessary for error detection and correction (ECC) processing is added to user data (data in units of sectors) recorded on a disk medium. A disk controller (HDC) of the drive has an error correction unit which executes the error detection/correction processing by using the user data and the ECC data output from the read channel.

The error correction unit of the HDC can exhibit a good error correction ability if error positional information showing the error position at which an error occurred in the user data can be acquired. Among read channels in recent years, there has been developed a read channel including an erasure pointer (hereinafter called "EP unit") generating error positional information from the decoded output of the user data.

The EP unit generates error positional information in which, for example, a bit position which cannot be distinguished as either "0" or "1" in a bit row of the data is made to be erasure. Namely, the error positional information is information showing an error position at which there is a high possibility that an error has occurred. However, there are cases in which information, in which an area where an error has actually not occurred is also indicated as an error position, is included in the error positional information generated by the EP unit. In the error correction unit, if error positional information having low reliability is used, there is the possibility that the error correction ability will deteriorate more than in the case in which error positional information is not used.

BRIEF SUMMARY OF THE INVENTION

In accordance with one embodiment of the present invention, there is provided a disk drive including error correction unit for correcting data read from a disk medium using reliable error position information.

The disk drive comprises a read unit which reads data recorded on the disk medium; an erasure unit which generates error positional information for specifying an error position having a high possibility of error among the data read by the read unit; a storage unit which accumulates the error positional information; and an error correction unit which executes error correction processing of data read by the read unit, by using the error positional information accumulated in the storage unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing main portions of a disk drive according to an embodiment of the present invention.

DETAILED DESCRIPTION OF THE INVENTION

Figure 2:
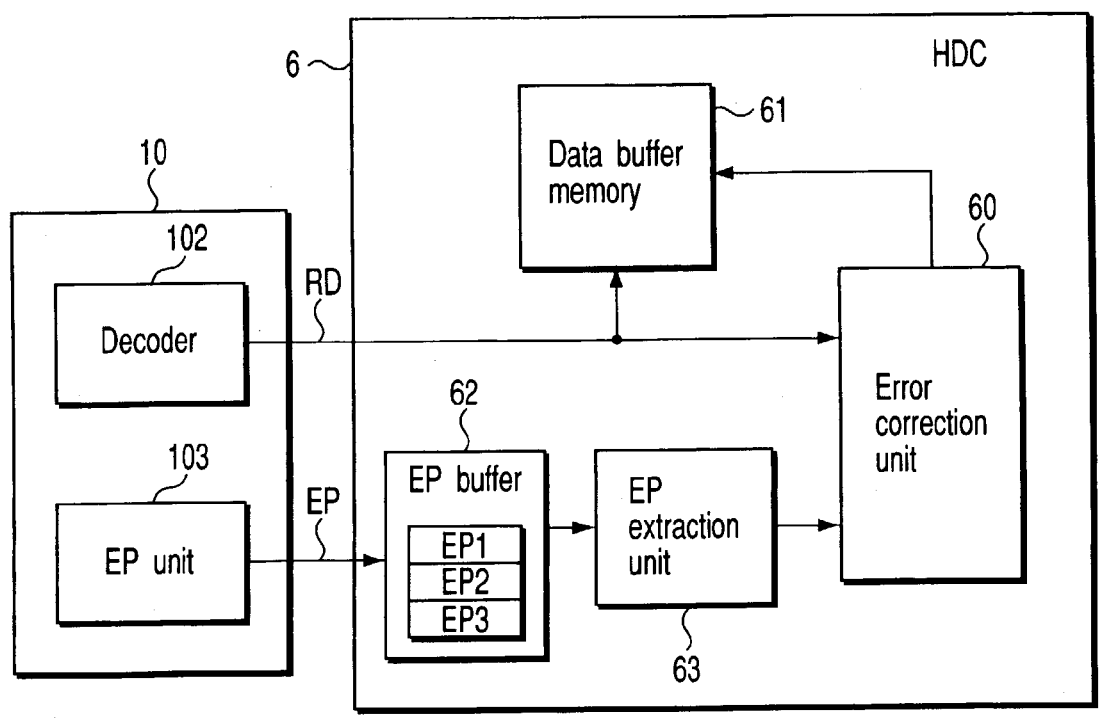
FIG. 2 is a block diagram showing main portions of a disk controller according to the embodiment.

Hereinafter, an embodiment of the present invention will be described.

(Configuration of Disk Drive)

As shown in FIG. 1, a disk drive has a disk medium 1 which is a recording medium, a spindle motor (SPM) 2, and a magnetic head 3.

At the time of read/write operation (recording playing-back operation) of data, the disk medium 1 is rotated at high speed by the SPM 2. The disk medium 1 is a magnetic recording medium recording data by a magnetic recording system.

The magnetic head 3 has a read head for reading data and a write head for writing data. The magnetic head 3 has a structure in which the read and write heads are separately mounted on the same slider. Further, the magnetic head 3 is configured so as to be moved in a radial direction on the disk medium 1 by being loaded on a head moving mechanism which is called an actuator. The read head is a read-dedicated head for reading data signals from the disk medium 1, and is generally formed from a giant magnetoresistance effect type element (a GMR element or a spin valve type MR element). On the other hand, the write head is an inductive head, and generates a recording magnetic field in accordance with the write current supplied from a write amplifier, and magnetically records the data signal on the disk medium 1.

Moreover, the disk drive has a pre-amplifier circuit 4, a read/write channel (data channel) 5, a disk controller (HDC) 6, and a microprocessor (CPU) 8. The CPU 8 is the main control unit of the drive, and controls the positioning operation of the head 3 and the read try operation.

The pre-amplifier circuit 4 has a read amplifier and a write amplifier. The read amplifier amplifies the data signal (read signal) read by the read head, and transmits it to a read channel 10 of the read/write channel 5. The write amplifier converts the data signal (write data WD) supplied from a write channel 11 of the read/write channel 5 into write current and transmits it to the write head.

The read/write channel 5 is formed from the read channel 10 and the write channel 11. The write channel 11 executes processing such as encoding processing and recording compensation processing with respect to the write data WD from the disk controller (HDC) 6.

The read channel 10 is usually a PRML (partial response maximum likelihood) type signal processing circuit, and, broadly divided, has an AGC amplifier 100, a signal processing unit 101, a decoder 102, and an EP (erasure pointer) unit 103. The AGC amplifier 100 has an AGC (automatic gain control) function, and maintains the level of a data signal at a constant level. The signal processing unit 101 is, for example, a digital signal processing unit including, for example, a lowpass filter, an A/D (analog-to-digital) converter, a digital equalizer, and the like. The decoder 102 decodes the data signal (digital signal) output from the signal processing unit 101 into original recorded data (user data RD).

The EP unit 103 generates error positional information EP showing a position where there is a high possibility that an error has occurred, among the data (user data RD) output from the decoder 102. The error positional information EP is information in which a bit position, which cannot be distinguished as either "0" or "1", for example, among data of 8 bits, is made to be an erasure. Alternatively, the error positional information EP is information which shows an error positional area showing a data area of 8 bits where there is a high possibility that an error has occurred.

The HDC 6 configures an interface between the disk drive and a host system 7, and receives the write data WD from the host system 7, and has the function of transmitting the user data (RD) which is the read data to the host system 7.

Configuration of HDC 6

As shown in FIG. 2, the HDC 6 of the embodiment has an error correction unit (ECC unit) 60, a data buffer memory 61, an EP buffer memory 62, and an EP information extraction unit 63. Note that, in addition thereto, the HDC 6 includes a data transmitting circuit and a data (including commands) sending/receiving circuit which structure the host interface with the host system 7.

The data buffer memory 61 is a buffer memory for temporarily storing the user data RD transmitted from the read channel 10. The data buffer memory 61 usually stores user data in units of sectors. On the other hand, the EP buffer memory 62 accumulates the error positional information EP output from the EP unit 103 included in the read channel 10. The EP buffer memory 62 accumulates, in addition to the most recent error positional information EP1, a predetermined amount of past error positional information EP2, EP3, i.e., the history of the error positional information.

The EP information extraction unit 63 extracts (selects) highly accurate error positional information from among the present and past error positional information EP1 to EP3 accumulated in the EP buffer memory 62, and outputs it to the error correction unit 60. The error correction unit 60 executes error correction processing of the user data stored in the data buffer memory 61 by using the ECC data transmitted from the read channel 10. At this time, the error correction unit 60 estimates the error position of the user data RD from the error positional information.

Error Correction Operation

Figure 3:
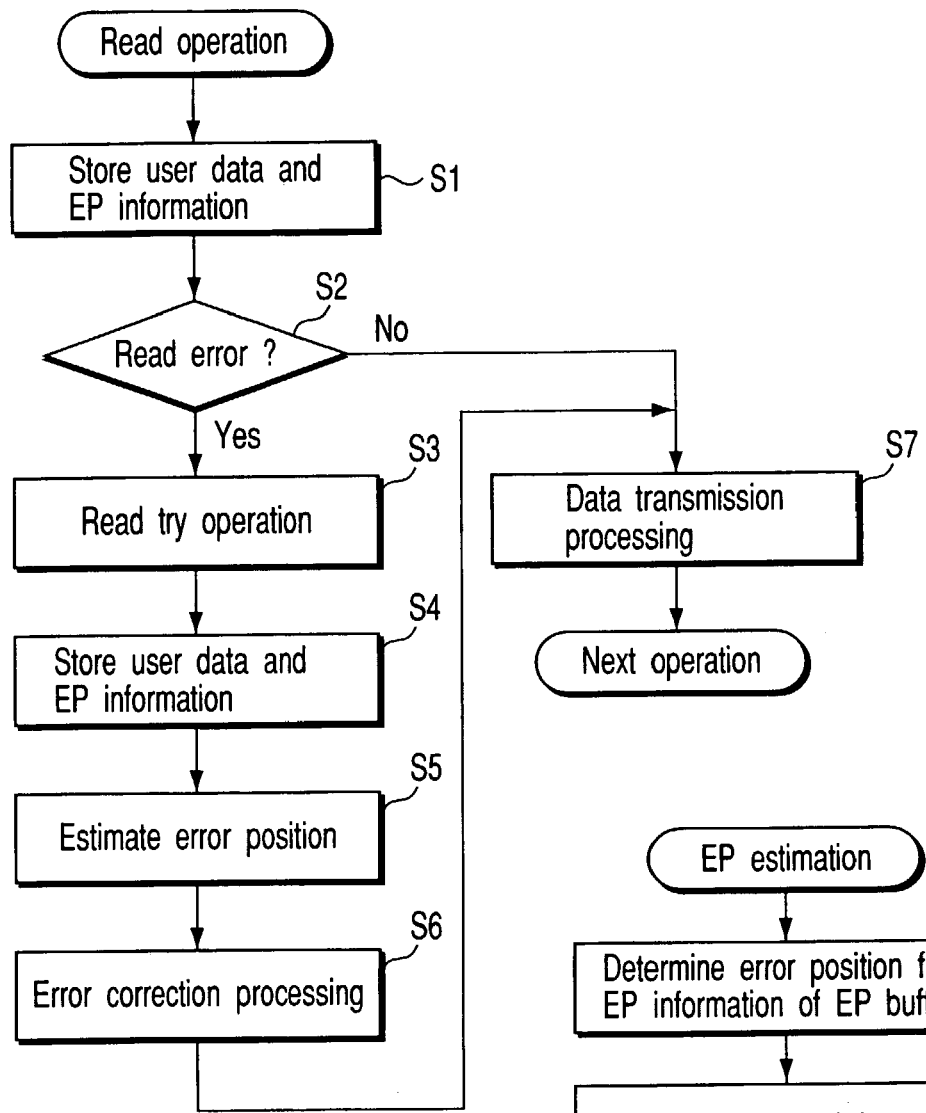
FIG. 3 is a flowchart for explanation of the procedures of error correction operation according to the embodiment.

The error correction operation of the present embodiment will be described with reference to the flowchart of FIG. 3 in addition to FIGS. 1 and 2.

Here, a read operation of reading the user data from a designated recording area (a designated data sector included in a designated track) on the disk medium 1, is supposed. In the read operation, the CPU 8 of the drive positions the read head included in the head 3 on a designated track on the disk medium 1.

The read channel 10 inputs, via the read amplifier, the data signal read by the read head, and reproduces the user data (including the ECC data) RD via the AGC amplifier 100, the signal processing unit 101, and the decoder 102. Here, the EP unit 103 generates error positional information EP from the user data RD decoded by the decoder 102.

The HDC 6 stores the user data RD transmitted from the read channel 10 in the data buffer memory 61 at the time of the read operation, and accumulates the error positional information EP in the EP buffer memory 62 (step S1). Here, the read channel 10 transmits the user data in units of, for example, 8 bits to the HDC 6. The error positional information EP is information showing an error position (bit position) where there is a high possibility that an error has occurred. The data (bit) at which there is a high possibility that an error has occurred is an erasure which cannot be distinguished as either of "0" or "1".

At the time of the read operation, when a read error does not occur or when a read error can be corrected, the HDC 6, as needed, proceeds to data transmission processing for transmitting to the host system 7 the user data RD stored in the buffer memory 61 after the error areas were corrected (NO at step S2, S7).

On the other hand, at the time of the read operation, when the error correction unit 60 of the HDC 6 detects a read error which cannot be corrected by one read operation, the CPU 8 proceeds to the read try operation (YES at step S2, S3). Namely, the CPU 8 executes the read operation again with respect to the recorded area where the read operation has been executed on the disk medium 1. The CPU 8 repeats the read try operations a predetermined number of times. If the read error still cannot be corrected, the CPU 8 gives a notification that the error cannot be recovered to the host system 7 via the HDC 6.

At the time of this read try operation, in the same way as at the time of the read operation, the HDC 6 stores the user data RD transmitted from the read channel 10 in the data buffer memory 61, and accumulates the error positional information EP in the EP buffer memory 62 (step S4). Accordingly, the most recent to the past error positional information EP1 to EP3 are accumulated in the EP buffer memory 62.

The EP information extraction unit 63 estimates a highly accurate error position among the user data RD by using the most recent to the past error positional information EP1 to EP3 accumulated in the EP buffer memory 62 (step S5). Specifically, for example, among the error positional information EP1 through EP3 obtained by read operations (read try operations) of three times, only an error position detected as an error position by read operations of two times or more is estimated as highly accurate error positional information. In other words, the EP information extraction unit 63 selects, as highly reliable information, an error positional information showing an error position whose error frequency is relatively high among the user data RD of, for example, 8 bits.

The error correction unit 60 executes the error correction processing of the user data held in the data buffer memory 61 by using the ECC data transmitted from the read channel 10 (step S6). At this time, the error correction unit 60 estimates the error position of the user data RD from the highly accurate error positional information extracted (selected) by the EP information extraction unit 63. The HDC 6 proceeds to the data transmission processing for transmitting the user data RD, for which the error correction processing is completed, from the data buffer memory 61 to the host system 7 (step S7).

As described above, in accordance with the error correction system of the present embodiment, the error correction processing with respect to the user data RD in which a read error has occurred is executed by using the error positional information EP obtained from the read channel 10 at the time of the read operation (including the read try operation). The HDC 6 of the present embodiment can use only the highly accurate error positional information by using the most recent to the past error positional information EP1 to EP3 accumulated in the EP buffer memory 62 by the EP information extraction unit 63. Accordingly, because the error correction unit 60 can estimate a highly accurate error position, the error correction unit 60 can execute the error correction processing with respect to the user data RD with a high error correction ability.

Note that, in the present embodiment, the error positional information EP1 through EP3 showing the error position (bit) of the user data RD of, for example, units of 8 bits, is accumulated in the EP buffer memory 62. The configuration of the error positional information EP1 to EP3 may be a configuration in which information of, for example, several bits per symbol (8 bits) is allocated, and information of several bits corresponding to the symbol is incremented (+1) each time of receiving obtained error positional information accompanying the execution of the read operation. Further, it may be a configuration in which information of one bit is allocated per symbol, and information of one bit corresponding to the symbol is ANDed each time of receiving obtained error positional information accompanying the execution of the read operation. In brief, bit information formed from one bit or several bits per symbol may be allocated as the error positional information accumulated in the EP buffer memory 62, and the operational results of executing a predetermined operation with respect to the bit information corresponding to the symbol of the most recent error positional information may be used.

Modified Example

Figure 4:
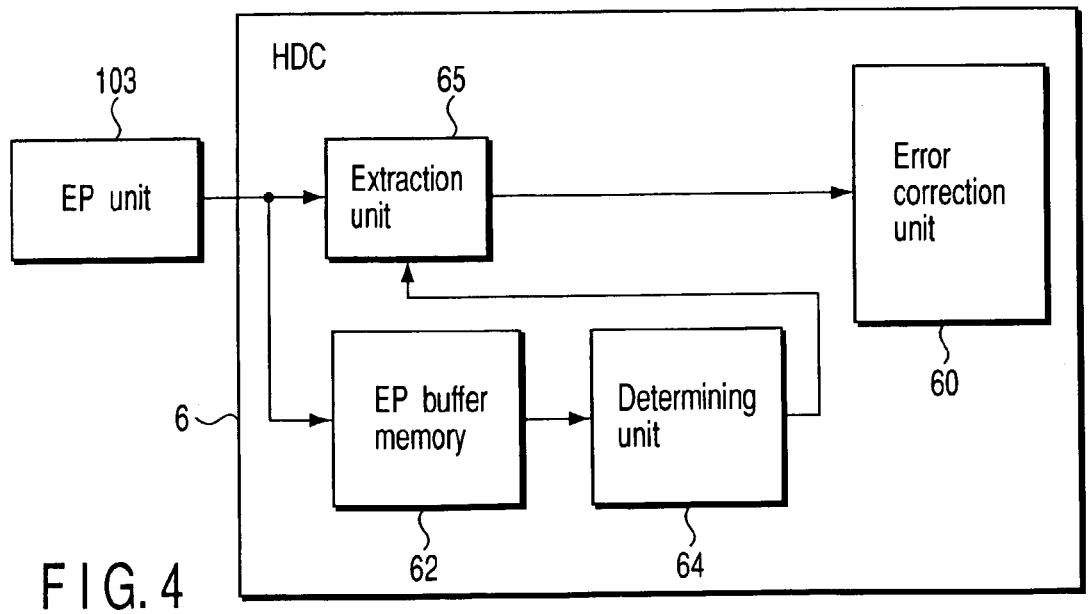
FIG. 4 is a block diagram showing main portions of a disk controller according to a modified example of the embodiment.
Figure 5:
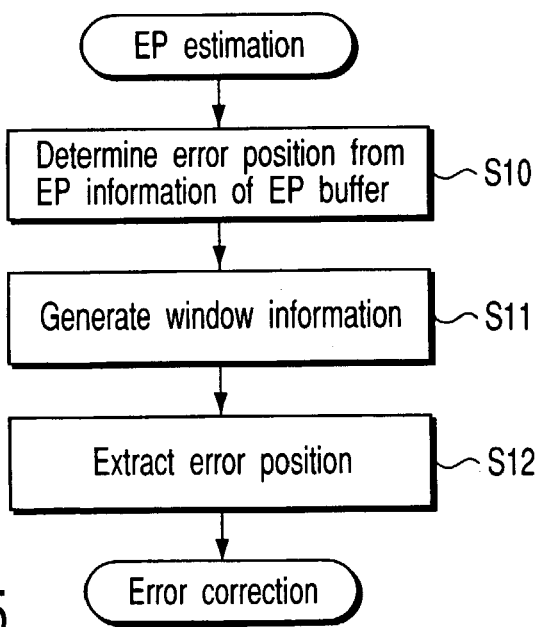
FIG. 5 is a flowchart for explanation of a method of processing error positional information according to the modified example.

FIGS. 4 and 5 are drawings according to a modified example of the present embodiment.

The modified example is a configuration having a determining unit 64 for estimating in advance an area (bit position) at which highly reliable error positional information can be obtained from the past error positional information accumulated in the EP buffer memory 62.

Specifically, as shown in FIG. 4, the HDC 6 according to the modified example has, in addition to the determining unit 64, an extraction unit 65 for extracting only the highly accurate error positional information from the error positional information output from the EP unit 103 included in the read channel 10. Note that configurations other than this structure are similar to the structures shown in FIGS. 1 and 2.

The configuration and operations of the modified example will be described with reference to the flowchart of FIG. 5.

First, in the present embodiment, the HDC 6 stores the user data RD transmitted from the read channel 10 in the data buffer memory 61 at the time of the read operation, and accumulates the error positional information EP in the EP buffer memory 62.

The determining unit 64 estimates in advance an area (a range of error bit positions) at which highly reliable error positional information can be obtained, from the past error positional information accumulated in the EP buffer memory 62 (step S10). Moreover, the determining unit 64 generates window information which is necessary for making only the error positional information of the estimated area pass through, and outputs it to the extraction unit 65 (step S11).

When the most recent error positional information is input from the EP unit 103 of the read channel 10, the extraction unit 65 allows passage of (extracts) only the error positional information in the estimated area as an error position by means of the window information from the determining unit 64 (step S12).

The error correction unit 60 executes error correction processing of the user data held in the data buffer memory 61 by using the ECC data transmitted from the read channel 10. At this time, the error correction unit 60 estimates the error position of the user data RD from the most recent and highly reliable error positional information which has been extracted (which has been passed through) by the extraction unit 65. Thereafter, the HDC 6 proceeds to the data transmission processing for transmitting the user data RD, for which the error correction processing is completed, from the data buffer memory 61 to the host system 7.

In brief, the modified example can exclude the error positional information outside of the estimated area from among the most recent error positional information by estimating in advance an area (a range of error bit positions) at which highly reliable error positional information can be obtained in advance from among the past error positional information. Accordingly, because the error positional information included in the area at which errors originally do not arise can be excluded, the error correction unit 60 can carry out error correction processing by using only highly reliable information.

As described above, in brief, in accordance with the present embodiment and the modified example thereof, the error positional information which can be obtained from the EP unit 63 are accumulated, and error positional information which has relatively high reliability is selected from among the plurality of error positional information. As a result, in data in which an error occurs, a highly accurate error position can be estimated by using highly reliable error positional information. In accordance therewith, the error correction ability of user data in which a read error arises can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive using a disk medium for recording data, comprising:

a head which reads data recorded on the disk medium;

a read unit which includes a decoder for decoding the data read by the head and a generator unit for generating error positional information for specifying an error position having a possibility of error among the data output from the decoder;

a storage unit which accumulates the error positional information including the history of the error positional information;

an extraction unit which extracts error positional information having relatively high reliability from among the error positional information accumulated in the storage unit; and an error correction unit which executes error correction processing of data output from the read unit, by using the error positional information extracted by the extraction unit.

2. The disk drive according to claim 1, wherein the storage unit stored information showing a recorded area on the disk medium on which the data is recorded is, together with the error positional information.

3. The disk drive according to claim 1, wherein the generator unit generates error positional information showing a bit position estimated to be an error among data decoded by the decoder included in the read unit.

4. The disk drive according to claim 1, wherein the generator unit generates error positional information showing an error positional area formed from a predetermined number of bits which is estimated to be an error among data decoded by the decoder included in the read unit.

5. The disk drive according to claim 1, wherein the generator unit generates error positional information to which is allocated bit information formed from one bit or several bits per symbol of data output from the decoder.

6. The disk drive according to claim 1, further comprising:
a control unit which executes a read try operation executing a read operation of data again from the same recorded area on the disk medium when an error of the data output from the read unit cannot be corrected by the error correction unit.

7. The disk drive according to claim 6, wherein when the read try operation is executed by the control unit, the storage unit stores the error positional information generated by the generator unit.

8. The disk drive according to claim 1, wherein the extraction unit extracts error positional information showing an error position which has a relatively high frequency from among the error positional information stored in the storage unit.

9. The disk drive according to claim 1, further comprising:
a disk controller which includes a buffer memory that stores data output from the read unit, and which executes data transmission with respect to a host system from the buffer memory,
wherein the storage unit and the error correction unit are included in the disk controller.

10. A disk controller for transferring data output from a read unit to a host system in a disk drive, comprising:
a buffer memory which stores data output from the read unit;
a storage unit which accumulates error positional information output from the read unit, the error positional information specifying an error position having possibility of error among the data and including the history of the error positional information;
an extraction unit which extracts error positional information having relatively high reliability from among the error positional information accumulated in the storage unit; and
an error correction unit which executes error correction processing of the data stored in the buffer memory, by using the error positional information extracted by the extraction unit.

11. The disk controller according to claim 10, wherein the error positional information is generated by an erasure unit included in the read unit, and shows
a bit position estimated to be an error.

12. The disk controller according to claim 10, wherein the error positional information is generated by an erasure unit included in the read unit, and shows
an error positional area formed from a predetermined number of bits which is estimated to be an error.

13. The disk controller according to claim 10, wherein the disk drive executes a read try operation executing a read operation of data again from the same recorded area on the disk medium when an error of data read from the disk medium cannot be corrected by the error correction unit, and
the storage unit stores the error positional information accompanying the read try operation.

14. The disk controller according to claim 10, wherein the extraction unit extracts error positional information showing an error position which has a relatively high frequency from among the error positional information accumulated in the storage unit.

15. A method of error correction of data output from a read unit in a disk drive, the method comprising:
generating error positional information for specifying an error position having a possibility of error among the data;
accumulating the error positional information including the history of the error positional information in memory;
extracting error positional information having relatively high reliability from among the error positional information accumulated in the memory; and
executing error correction processing of the data output from the read unit, by using the error positional information extracted from the memory.

16. The method according to claim 15, further comprising:
executing a read try operation when an error arises in the read data at a first read operation; and
accumulating, in the-memory, plural items of error positional information obtained by the read operation and the read try operation.

* * * * *